United States Patent Office 2,767,584
Patented Oct. 23, 1956

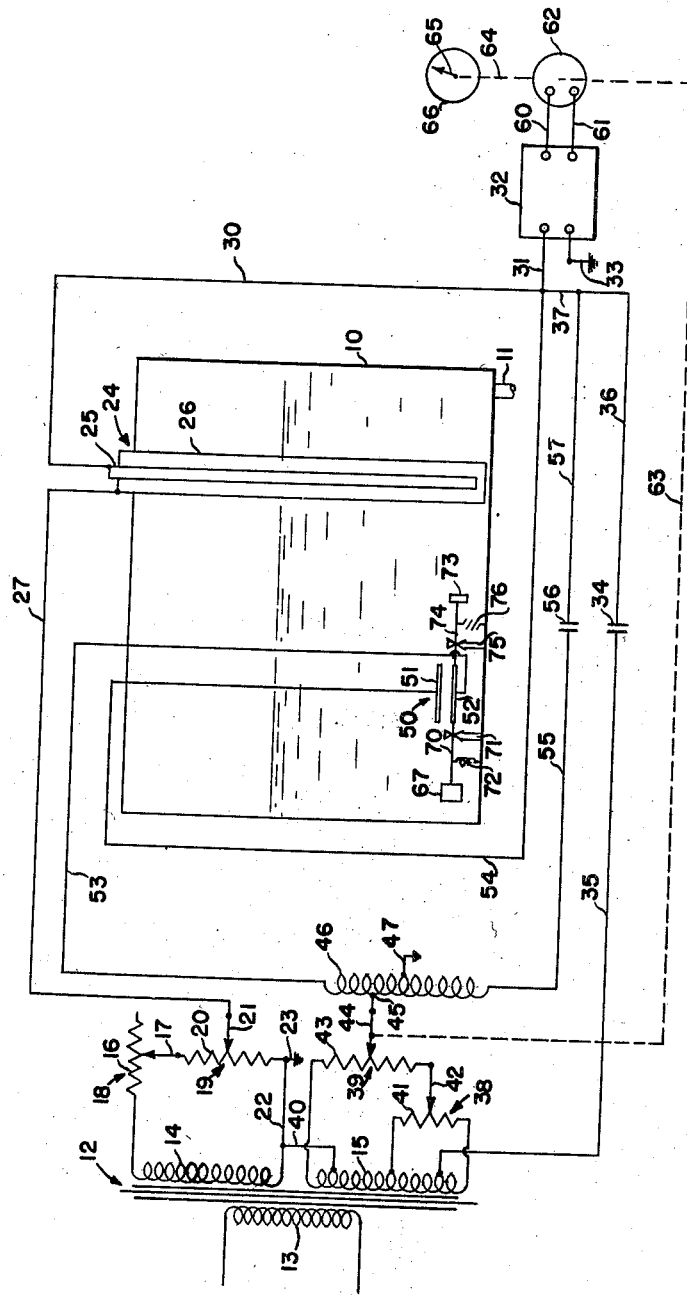

2,767,584
FLUID QUANTITY MEASURING APPARATUS

Richard M. Franzel, Edina, and Le Roy A. Griffith, Minneapolis, Minn., assignors to Minneapolis-Honeywell Regulator Company, Minneapolis, Minn., a corporation of Delaware Application September 28, 1953, Serial No. 382,700

13 Claims. (Cl. 73—304)

This invention relates generally to apparatus for measuring the quantity of a substance in a container and particularly to apparatus for measuring by capacitive means the quantity of fuel in aircraft fuel tanks. It is therefore an object of this invention to design new and improved apparatus for measuring the quantity of fuel in an aircraft fuel tank.

At the present time the most accurate fuel gage known is the capacitive type which utilizes a capacitor having plates extending from the top of the fuel tank to the bottom. Since the dielectric constant of fuel is approximately twice that of air the capacitance of the capacitor, or tank unit as it is generally called, increases to about double its previous value as the tank goes from empty to full. This measuring tank unit provides a signal which is dependent upon the height or volume of the fuel and its dielectric constant.

It is important that the weight of fuel be indicated rather than merely the volume because an engine generates horsepower according to the weight or B. t. u.'s of the fuel it consumes in a given period of time. If the weight of a given volume of fuel always remained the same the difference between volume and weight would be a constant and the indicator dial could be calibrated to give a weight indication for a volume signal. However, the volume of a given weight of fuel varies with change in temperature so that a particular volume of fuel at one temperature will not weigh the same as that volume at another temperature. For the fuels used with reciprocating engines the dielectric constant of the fuel varies closely with change in volume for temperature changes. This makes it possible to multiply the volume indication by the dielectric constant and receive a signal proportional to the weight of the fuel.

For the fuels used with jet engines, however, the dielectric constant does not vary proportionally with change in volume. Therefore, in order to provide a true weight indication of the fuel it is necessary to eliminate the effect of variations in the dielectric constant of the fuel on the signal by adding a density signal. The effect of variations in the dielectric constant may be eliminated by placing a second capacitor in the fuel tank near the bottom of the tank so that there is always fuel between its plates. This capacitor, which may be called a compensator tank unit, is connected into the measuring circuit so that the signal due to this tank unit opposes and neutralizes the proportion of the signal from the measuring tank unit attributable to the differences in dielectric constant of the fuel as will be explained subsequently. The density indication may then be added by causing a float to operate on one of the plates of the compensator capacitor to move the plate such that upon increased density the distance between the plates increases and upon decreased density the distance between the plates decreases. As a result, the resultant signal controlling the indicator is due to the volume of the fuel and its density and so is a signal proportional to the weight of the fuel.

The above described circuit operates satisfactorily for measuring the weight of fuel in tanks which remain stationary or move at a constant velocity at the same altitude. However, for aircraft such as fighter aircraft which accelerate and decelerate and change altitude rapidly, changes in velocity and direction could cause errors of appreciable magnitude due to the inertia of the movable plate of the compensator capacitor. A primary object of this invention is to devise apparatus for preventing this error from arising.

Another object of this invention is to devise simple, light-weight apparatus for eliminating errors due to change in velocity in fuel weight measuring apparatus.

Another object of this invention is to devise apparatus for eliminating errors due to change in velocity in fuel weight measuring apparatus which may be easily added to already existing equipment.

A further object of the invention is to devise small, inexpensive apparatus for eliminating errors due to change in velocity in fuel weight measuring apparatus.

For a detailed explanation of the invention reference is had to the following description taken in conjunction with the accompanying drawing in which the single figure is a schematic diagram showing one embodiment of the invention.

The quantity of fuel which is to be measured is contained in a tank 10 having an outlet 11 connected to an engine or engines, not shown. The tank shown in the drawing is symmetrical in shape though it is realized, that because of space limitations, most aircraft fuel tanks are not of this shape.

The energization for the fuel quantity measuring apparatus is derived from a transformer 12 having a primary winding 13 connected to a source of voltage, not shown. The transformer 12 has two transformer secondary windings 14 and 15.

A rheostat 18 having a resistor 16 and a wiper arm 17 has one terminal of the resistor connected to the upper end of upper transformer secondary winding 14. A potentiometer 19 having a resistor 20 and a wiper arm 21 has one terminal of the resistor connected to the wiper arm 17 of rheostat 18. The lower end of potentiometer resistor 20 is connected to the lower terminal of transformer secondary winding 14 by conductor 22 and is also connected to a ground terminal 23.

A first impedance type sensing means in the form of a measuring tank unit 24 extends from the top of tank 10 to the bottom. Tank unit 24 has an inner electrode 25 and an outer electrode 26 which are cylindrical in shape and concentric. As the level of the fuel in the tank 10 rises and falls the capacitance of measuring tank unit 24 varies to change the signal derived therefrom. If the tank 10 should be nonrectangular in shape the tank unit 24 may be constructed as described and claimed in the Condon Reissue Patent No. 23,844, or as described and claimed in the Meyers application, Serial No. 192,685, filed October 28, 1950, both assigned to the same assignee as the present invention.

The outer electrode 26 of tank unit 24 is connected to wiper arm 21 of potentiometer 19 by conductor 27. The inner electrode 25 of tank unit 24 is connected by conductors 30 and 31 to the input circuit of an amplifier 32. The other input terminal of amplifier 32 is connected to a ground terminal 33.

One plate of a capacitor 34 is connected near the lower end of transformer secondary winding 15 by conductor 35 and its other plate is connected to the ungrounded input terminal of amplifier 32 by conductors 36, 37 and 31. Transformer secondary winding 15 is connected near its upper end to ground terminal 23 by conductors 40 and 22. As a result, the phase of the voltage energizing capacitor 34 is in opposition to the phase of the voltage energizing tank unit 24. Capacitor 34 is designed to have such a value that the signal from capacitor 34 is equal in magnitude but opposite in phase to the signal from tank unit 24 when tank 10 has no fuel in it. That is, the signal from capacitor 34 neutralizes the signal from tank unit 24 when there is no fuel in the tank.

A potentiometer 38 having a resistor 41 and a wiper arm 42 is connected across the lower portion of transformer secondary winding 15. A potentiometer 39 having a resistor 43 and a wiper arm 44 is connected between the upper terminal of transformer secondary winding 15 and wiper arm 42 of a potentiometer 38. The wiper arm 44 of potentiometer 39 is connected to a point 45 of an autotransformer 46 which is center tapped and connected to a ground terminal 47.

A second impedance type sensing means in the form of a compensator tank unit 50 has an upper plate 51 and a lower plate 52. The upper terminal of autotransformer 46 is connected by conductor 53 to one of the plates of compensator tank unit 50. The other capacitor plate of compensator tank unit 50 is connected by conductors 54 and 31 to the ungrounded input terminal of amplifier 32. The lower terminal of autotransformer 46 is connected by conductor 55 to one of the plates of a capacitor 56 and the other plate of this capacitor is connected by conductors 57, 37 and 31 to the ungrounded input terminal of amplifier 32.

Because capacitor 56 is connected to the opposite terminal of autotransformer from compensator tank unit 50 the signal from capacitor 56 opposes the signal from compensator tank unit 50. Capacitor 56 is so designed that its signal is equal in magnitude but opposite in phase to the signal from compensator capacitor 50 when there is no fuel between the plates 51 and 52 of the compensator capacitor.

Amplifier 32 is connected by conductors 60 and 61 to control a motor 62. The motor 62 is connected by mechanical connection 63 to the wiper arm 44 of potentiometer 39 for rebalancing purposes and is also connected by mechanical connection 64 to an indicator pointer 65 coacting with an indicator dial 66 to indicate the quantity of fuel in the tank 10.

The apparatus is calibrated as follows:

With no fuel in the tank the wiper arm 17 is moved along resistor 16 until the apparatus is nearly in balance, pointer 65 indicating practically no fuel in the tank and wiper arm 44 being near the ground point on potentiometer resistor 43. For fine empty calibration, the potentiometer wiper arm 21 is then moved along potentiometer resistor 20 until the pointer 65 shows exactly no fuel in the tank. At this point the wiper arm 44 is at the ground potential point on potentiometer resistor 43.

The tank is then filled with fuel causing the signal from tank unit 24 to increase and causing motor 62 to drive potentiometer wiper arm 44 downwardly along potentiometer resistor 43 and move pointer 65 along indicator dial 66 toward the full mark. Wiper arm 42 is then moved along potentiometer resistor 41 until the indicator pointer 65 indicates that the tank is absolutely full, wiper arm 44 now being at the lower end of potentiometer resistor 43.

With the signal from capacitor 34 balancing out the empty tank signal from tank unit 24 and the signal from capacitor 56 balancing out the empty tank signal from compensator capacitor 50 the only effective signals remaining are the signal from tank unit 24 due solely to fuel in the tank and the signal from tank unit 50 due solely to fuel between the electrodes 51 and 52. Thus, the signal from tank unit 24 is due to the height of the fuel in the tank and the dielectric constant of that fuel and the signal from compensator tank unit 50, because this unit is always immersed, is due solely to the dielectric constant of the fuel. When the apparatus is in balance, the signals from tank unit 24 due to variation in dielectric constant value and tank unit 50 completely neutralize each other. As a result there is 100 percent dielectric constant compensation. Because the only variable is that of the height of the fuel in the tank the circuit as so far described would, by using the characterized tank unit described in the above mentioned applications, provide an indication on the indicator dial of the volume of fuel in the tank.

In order to provide a weight indication of the fuel in the tank it is necessary to modify the volume signal by a density signal.

A density signal may be added to the circuit by designing the compensator capacitor 50 such that one of its plates, for example the lower one, is movable with respect to the upper plate. The lower plate, as shown in the drawing, may be connected to a float 67 by a lever arm 70 operating about a pivot 71, the float acting against tension spring 72. The float 67 rises and falls in the fuel with change in density of the fuel, it being constructed of such material that it is always lighter than any fuel which might be put in the tank so that it always pulls against the spring 72. With decreased density the float 67 sinks, while with increased density of the fuel, the float 67 rises, to move by lever 70, plate 52 either closer to or farther from plate 51 of compensator tank unit 50. As a result of varying the distance between the plates 51 and 52 of compensator capacitor 50 with change in density, the signal due to compensator capacitor 50 is due to the density of the fuel as well as the dielectric constant. Since the dielectric change in constant effects of the two tank units, 24 and 50, neutralize each other, the remainders of the two signals are due to volume of the fuel and its density and so provides a weight indication.

The operation of the circuit thus far shown and described is more fully explained and claimed in a Storm application, Serial No. 372,033, filed August 3, 1953, and assigned to the same assignee as the present invention.

The circuit as thus far shown and described operates satisfactorily for indicating the weight of the fuel in containers which either remain stationary or move with a constant velocity. However, when placed in craft, such as fighter aircraft, large errors could develop with acceleration and deceleration of the craft when the acceleration or deceleration is of the type that effects movement of plate 52. In the preferred embodiment shown, acceleration or deceleration which has a vertical component is of the type which affects such movement. The errors which would result would be due to the inertia of movable plate 52 with respect to fixed plate 51 to cause variation of the distance between the two capacitor plates upon a particular change in velocity of the craft which has an effect on the movable plate 52. For this reason it is desirable to add apparatus which operates to eliminate the effects of acceleration and deceleration of this type on the signal from compensator tank unit 50.

In order to eliminate the effects of acceleration and deceleration of this type on the signal from compensator tank unit 50, a weight 73 is also connected to the lower capacitor plate 52 by a lever 74 acting over a pivot 75. Weight 73 acts against compression spring 76 to balance the effect of weight 73 except during acceleration and deceleration of the type which tends to effect movement of plate 52. Weight 73 is much more dense than the fuel in tank 10 and so relatively minor changes in density of the fuel will not appreciably affect the apparent weight of weight 73.

By the use of the weight 73 any tendency of movable plate 52 to increase the distance, for example, between capacitor plates 51 and 52 is completely counteracted by the weight 73 which tends to move the same direction as capacitor plate 52 because of the momentum applied to both components simultaneously due to the change in velocity of the craft which tends to effect such movement.

As a result of the use of weight 73 acceleration and deceleration of the craft in the manner which would normally effect the spacing between plates 51 and 52 has no effect upon the distance between the capacitor plates 51 and 52 of compensator tank unit 50. By the use of a change in velocity correcting apparatus such as just shown and described it is possible to have a highly accurate, yet simple and lightweight easily constructed weight measuring apparatus for use in measuring the fuel in aircraft.

While a preferred embodiment of the invention has been shown and described it is realized that modifications can be made by those skilled in the art and is therefore intended that this invention be limited only to the extent of the appended claims.

I claim as my invention:

1. Apparatus for measuring the quantity of fluid in a container subject to changes in velocity comprising in combination: a first sensing means inserted in a container of fluid subject to changes in velocity and sensitive to the height and a further characteristic of the fluid and connected to a source of voltage such as to derive a signal indicative of the height and the further characteristic of the fluid in the container; a second sensing means having a member movable in response to changes in density of the fluid and having its movement affected by changes in velocity of the container, said second sensing means inserted in the container and sensitive to the density and the further characteristic of the fluid and connected to the source of voltage such as to derive a signal of opposite direction to the signal derived from said first sensing means, the signal derived from said second sensing means being indicative of the density and the further characteristic of the fluid in the container; velocity change sensing means connected to said second sensing means and neutralizing the effect of the changes in velocity which tend to cause movement of said member; and comparing means connected to said first and second sensing means such as to eliminate the effect of a change in the further characteristic of the fluid and provide a signal at all times dependent upon the height and density of the fluid in the container despite changes in velocity of the container.

2. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; a second capacitive sensing means having at least two plates with one plate movable in a given direction with respect to the others with change in density and having its movement affected by changes in velocity of the container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; velocity change sensing means connected to said second sensing means and neutralizing the effect of the changes in velocity which tends to cause movement of said one plate in said given direction; and comparing means connected to said first and second sensing means such as to eliminate the effect of a change in the dielectric constant of the fluid and provide a signal at all times dependent upon the weight of the fluid in the container despite changes in velocity of the container.

3. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; a second capacitive sensing means having at least two plates with one plate movable in a given sense to vary the distance between the plates with change in density and having its movement affected by changes in velocity of the container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; velocity change sensing means connected to the movable plate of said second sensing means and neutralizing the effect of changes in velocity which tend to vary the distance between the plates of said second sensing means in said given sense; and comparing means connected to said first and second sensing means such as to eliminate the effect of a change in the dielectric constant of the fluid and provide a signal at all times dependent upon the weight of the fluid in the container despite changes in velocity of the container.

4. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; a second capacitive sensing means having at least two plates with one plate movable in a first and an opposite direction with respect to the others with change in density and having its movement affected by changes in velocity of the container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; velocity change sensing means connected to said second sensing means and neutralizing the effect of the changes in velocity which tend to effect movement of said one plate in said first or opposite direction; comparing means connected to said first and second sensing means such as to eliminate the effect of a change in the dielectric constant of the fluid and provide a signal at all times dependent upon the weight of the fluid in the container despite changes in velocity of the container; and rebalance means connected to said comparing means and to the connection of one of the sources of voltage to one of the sensing means for varying the signal derived from that sensing means until the difference in signals from said sensing means is reduced to zero.

5. Apparatus for measuring the quantity of fluid in a container subject to changes in velocity comprising in combination: a capacitive measuring tank unit inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; a capacitive compensator unit having at least two plates with one plate movable in a given manner with respect to the others with change in density to vary the distance between said plates and having its movement affected by changes in velocity or said container, said compensator unit inserted in the container and sensitive to the density and dielectric constant of the fluid and connected to a source of alternating voltage of a second phase such as to derive a signal of opposite phase to the signal derived from said measuring tank unit, the signal derived from said compensator unit being indicative of the density and dielectric constant of the fluid in the container; velocity change sensing means connected to the movable plate of said compensator unit and neutralizing the effect of the changes in velocity which tend to cause said one plate to move in said given manner to vary the distance between the plates of said compensator unit; comparing means connected to said measuring tank and compensator units such as to eliminate the effect of a change in the dielectric constant of the fluid and provide a signal at all times dependent upon the weight of the fluid in the container despite changes in velocity of the container; and rebalance means connected to said comparing means and to the connection of one of the sources of voltage to one of the units for varying the signal derived from that unit until the difference in signals from said units is reduced to zero.

6. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; impedance means connected to a source of alternating voltage of a second phase such as to derive a signal of opposite phase to the signal derived from said first sensing means and of a magnitude equal to the magnitude of the signal from said first sensing means upon no fluid being in the container; a second capacitive sensing means having at least two plates with one plate movable in a given manner with respect to the others with change in density and having its movement affected by changes in velocity of the container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; velocity change sensing means connected to said second sensing means and neutralizing the effect of the changes in velocity which tend to cause movement of said one plate in said given manner; and comparing means connected to said first and second sensing means and said impedance means such as to eliminate the effect of a change in the dielectric constant of the fluid and provide a signal at all times dependent upon the weight of the fluid in the container despite changes in velocity of the container.

7. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; impedance means connected to a source of alternating voltage of a second phase such as to derive a signal of opposite phase to the signal derived from said first sensing means and of a magnitude equal to the magnitude of the signal from said first sensing means upon no fluid being in the container; a second capacitive sensing means having at least two plates with one plate movable in a given manner to vary the distance between the plates with change in density and having its movement affected by changes in velocity of the container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; velocity change sensing means connected to the movable plate of said second sensing means and neutralizing the effect of the changes in velocity which tend to cause movement in said given manner and therefore to vary the distance between the plates of said second sensing means; and comparing means connected to said first and second sensing means and said impedance means such as to eliminate the effect of a change in the dielectric constant of the fluid and provide a signal at all times dependent upon the weight of the fluid in the container despite changes in the velocity of the container.

8. Apparatus for measuring the quantity of fluid in a container subject to changes in velocity comprising in combination: a capacitive measuring tank unit inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; impedance means connected to a source of alternating voltage of a second phase such as to derive a signal of opposite phase to the signal derived from said measuring tank unit and of a magnitude equal to the magnitude of the signal from said measuring tank unit upon no fluid being in the container; a capacitive compensator unit having at least two plates with one plate movable in a first and an opposite direction with respect to the other plate to thereby vary the distance between the plates with change in density and having its movement affected by changes in velocity of said container, said compensator unit inserted in the container and sensitive to the density and dielectric constant of the fluid and connected to a source of alternating voltage of a second phase such as to derive a signal of opposite phase to the signal derived from said measuring tank unit, the signal derived from said compensator unit being indicative of the density and dielectric constant of the fluid in the container; velocity change sensing means connected to the movable plate of said second sensing element and neutralizing the effect of the changes in velocity which tend to cause movement in said first or opposite direction and therefore vary the distance between the plates of said compensator unit; comparing means connected to said measuring tank and compensator units and said impedance means such as to eliminate the effect of a change in the dielectric constant of the fluid and provide a signal at all times dependent upon the weight of the fluid in the container despite changes in velocity of the container; and rebalance means connected to said comparing means and to the connection of one of the sources of voltage to one of the units for varying the signal derived from that unit until the difference in signals from said units is reduced to zero.

9. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; a second capacitive sensing means having at least two plates with one plate movable in a predetermined manner with respect to the others with change in density and having its movement affected by changes in velocity of said container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; impedance means connected to a source of alternating voltage of the first phase such as to derive a signal of opposite phase to the signal derived from said second sensing means and of a magnitude equal to the magnitude of the signal from said second sensing means upon no fluid being between the plates of the second sensing means; velocity change sensing means connected to said second sensing means and neutralizing the effect of the changes in velocity which tend to cause movement of said one plate in said predetermined manner; and comparing means connected to said first and second sensing means and said impedance means such as to eliminate the effect of a change in the dielectric constant of the fluid and provide a signal at all times dependent upon the weight of the fluid in the container despite changes in velocity of the container.

10. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; a second capacitive sensing means having at least two plates with one plate movable in a direction such as to vary the distance between the plates with change in density and having its movement affected by changes in velocity of said container, said second sensing means inserted in the container and sensitive to the density and dielectric constant of the fluid and connected to a source of alternating voltage of a second phase such as to derive a signal of opposite phase to the signal derived from said first sensing means, the signal derived from said second sensing means being indicative of the density and dielectric constant of the fluid in the container; impedance means connected to a source of alternating voltage of the first phase such as to derive a signal of opposite phase to the signal derived from said second sensing means and of a magnitude equal to the magnitude of the signal from said second sensing means upon no fluid being between the plates of the second sensing means; velocity change sensing means connected to the movable plate of said second sensing means and neutralizing the effect of the changes in velocity which tend to cause movement in said direction to vary the distance between the plates of said second sensing means; and comparing means connected to said first and second sensing means and said impedance means such as to eliminate the effect of a change in the dielectric constant of the fluid and provide a signal at all times dependent upon the weight of the fluid in the container despite changes in velocity of the container.

11. Apparatus for measuring the quantity of fluid in a container subject to changes in velocity comprising in combination: a capacitive measuring tank unit inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container: a capacitive compensator unit having at least two plates with one plate movable in a manner to vary the distance between said plates with change in density and having its movement affected by changes in velocity of said container, said compensator unit inserted in the container and sensitive to the density and dielectric constant of the fluid and connected to a source of alternating voltage of a second phase such as to derive a signal of opposite phase to the signal derived from said measuring tank unit, the signal derived from said compensator unit being indicative of the density and dielectric constant of the fluid in the container; impedance means connected to a source of alternating voltage of the first phase such as to derive a signal of opposite phase to the signal derived from said compensator unit and of a magnitude equal to the magnitude of the signal from said compensator unit upon no fluid being between the plates of the compensator unit; velocity change sensing means connected to the movable plate of said compensator unit and neutralizing the effect of the changes in velocity which tend to cause said one plate to move in said manner to vary the distance between the plates of said compensator unit; comparing means connected to said measuring tank and compensator units and said impedance means such as to eliminate the effect of a change in the dielectric constant of the fluid and provide a signal at all times dependent upon the weight of the fluid in the container despite changes in velocity of the container; and rebalance means connected to said comparing means and to the connection of one of the sources of voltage to one of the units for varying the signal derived from that unit until the difference in signals from said units is reduced to zero.

12. Apparatus for measuring the quantity of fluid in a container subject to changes in velocity comprising in combination: a first capacitive sensing means inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; first impedance means connected to a source of alternating voltage of a second phase such as to derive a signal of opposite phase to the signal derived from said first sensing means and of a magnitude equal to the magnitude of the signal from said first sensing means upon no fluid being in the container; a second capacitive sensing means having at least two plates with one plate movable in a manner to vary the distance between said plates with change in density and having its movement affected by changes in velocity of said container, said second sensing means inserted in the container and sensitive to the density and dielectric constant of the fluid and connected to a source of alternating voltage of the second phase such as to derive a signal of opposite phase to the signal derived from said first sensing means, the signal derived from said second sensing means being indicative of the density and dielectric constant of the fluid in the container; second impedance means connected to a source of alternating voltage of the first phase such as to derive a signal of opposite phase to the signal derived from said second sensing means and of a magnitude equal to the magnitude of the signal from said second sensing means upon no fluid being between the plates of the second sensing means; velocity change sensing means connected to the movable plate of said second sensing element and neutralizing the effect of the changes in velocity which tend to cause movement of said one plate in said manner to vary the distance between the plates of said second sensing means; and comparing means connected to said first and second sensing means and said first and second impedance means such as to eliminate the effect of a change in the dielectric constant of the fluid and provide a signal at all times dependent upon the weight of the fluid in the container despite changes in the velocity of the container.

13. Apparatus for measuring the quantity of fluid in a container subject to changes in velocity comprising in combination: a capacitive measuring tank unit inserted in a container of fluid subject to changes in velocity and sensitive to the volume and dielectric constant of the fluid and connected to a source of alternating voltage of a first phase such as to derive a signal of a first phase indicative of the volume and dielectric constant of the fluid in the container; first impedance means connected to a source of alternating voltage of a second phase such as to derive a signal of opposite phase to the signal derived from said measuring tank unit and of a magnitude equal to the magnitude of the signal from said measuring tank unit upon no fluid being in the container; a capacitive compensator unit having at least two plates with one plate movable in a manner to vary the distance between said plates with change in density and having its movement affected by changes in velocity of said container, said compensator unit inserted in the container and sensitive to the density and dielectric constant of the fluid and connected to a source of alternating voltage of the second phase such as to derive a signal of opposite phase to the signal derived from said measuring tank unit, the signal derived from said compensator unit being indicative of the density and dielectric constant of the fluid in the container; second impedance means connected to a source of alternating voltage of the first phase such as to derive a signal of opposite phase to the signal derived from said compensator unit and of a magnitude equal to the magnitude of the signal from said compensator unit upon no fluid being between the plates of the compensator unit; velocity change sensing means connected to the movable plate of said compensator unit and neutralizing the effect of the changes in velocity which tend to cause movement of said one plate in said manner to vary the distance between the plates of said compensator unit; comparing means connected to said measuring tank and compensator units and said first and said second impedance means such as to eliminate the effect of changes in the dielectric constant of the fluid and provide a signal at all times dependent upon the weight of the fluid in the container despite changes in velocity of the container; and rebalance means connected to said comparing means and to the connection of one of the sources of voltage to one of the units for varying the signal derived from that unit until the difference in signals from said units is reduced to zero.

References Cited in the file of this patent

UNITED STATES PATENTS

| | | |
|---|---|---|
| 1,287,860 | Bristol | Dec. 17, 1918 |
| 2,034,909 | Kollsman | Mar. 24, 1936 |
| 2,563,280 | Schafer | Aug. 7, 1951 |
| 2,581,085 | Edelman | Jan. 1, 1952 |
| 2,718,146 | Bancroft | Sept. 20, 1955 |
| 2,724,272 | De Giers | Nov. 22, 1955 |
| 2,724,273 | Sontheimer | Nov. 22, 1955 |
| 2,728,035 | Meredith | Dec. 20, 1955 |

FOREIGN PATENTS

| | | |
|---|---|---|
| 684,348 | Great Britain | Dec. 17, 1952 |